United States Patent
Ranganathan et al.

(10) Patent No.: US 12,367,343 B2
(45) Date of Patent: Jul. 22, 2025

(54) SYSTEMS AND METHODS FOR ADJUSTING A TRANSCRIPT BASED ON OUTPUT FROM A MACHINE LEARNING MODEL

(71) Applicant: Verizon Patent and Licensing Inc., Basking Ridge, NJ (US)

(72) Inventors: Prakash Ranganathan, Villupuram (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 17/946,389

(22) Filed: Sep. 16, 2022

(65) Prior Publication Data

US 2024/0095449 A1    Mar. 21, 2024

(51) Int. Cl.
*G06F 40/284* (2020.01)
*G06F 40/232* (2020.01)
*G06F 40/40* (2020.01)

(52) U.S. Cl.
CPC .......... *G06F 40/284* (2020.01); *G06F 40/232* (2020.01); *G06F 40/40* (2020.01)

(58) Field of Classification Search
CPC .... G06F 40/232; G06F 40/253; G06F 40/284; G06F 40/40; G10L 15/22
See application file for complete search history.

(56) References Cited

U.S. PATENT DOCUMENTS

| | | | |
|---|---|---|---|
| 9,772,816 B1 * | 9/2017 | Bigham | G06F 3/167 |
| 9,916,826 B1 * | 3/2018 | Slifka | G10L 15/00 |
| 10,579,742 B1 * | 3/2020 | Fernandez | G10L 15/16 |
| 11,556,722 B1 * | 1/2023 | Ben Shahar | G06F 40/51 |
| 2005/0033574 A1 * | 2/2005 | Kim | G10L 15/22 704/E15.04 |
| 2007/0027686 A1 * | 2/2007 | Schramm | G10L 13/00 704/235 |

(Continued)

FOREIGN PATENT DOCUMENTS

CN    108091328 A  *  5/2018 ........... G06F 40/232

OTHER PUBLICATIONS

Fujiwara, Kazuki. "Error correction of speech recognition by custom phonetic alphabet input for ultra-small devices." Proceedings of the 2016 chi conference extended abstracts on human factors in computing systems. (Year: 2016).*

(Continued)

*Primary Examiner* — Paras D Shah
*Assistant Examiner* — Oluwadamilola M Ogunbiyi (57) ABSTRACT

In some implementations, a transcription system may generate a first transcript based on audio data of a conversation between a first user and a second user. The transcription system may determine, using a first machine learning model of the transcript system, that a portion of the first transcript is incorrect. The transcription system may generate, using a second machine learning model, additional data for transcribing the audio data based on determining that the portion of the first transcript is incorrect. The additional data is generated using a portion of the audio data corresponding to the portion of the first transcript. The transcription system may generate a second transcript based on the audio data and the additional data. The transcription system may provide the second transcript to one or more devices.

20 Claims, 9 Drawing Sheets

(56) References Cited

U.S. PATENT DOCUMENTS

| | | | | |
|---|---|---|---|---|
| 2009/0276215 | A1* | 11/2009 | Hager | G06F 16/31 |
| | | | | 704/235 |
| 2010/0121637 | A1* | 5/2010 | Roy | G10L 15/22 |
| | | | | 704/235 |
| 2011/0022387 | A1* | 1/2011 | Hager | G06Q 10/107 |
| | | | | 715/752 |
| 2016/0028871 | A1* | 1/2016 | Peterson | H04W 4/12 |
| | | | | 455/413 |
| 2016/0063998 | A1* | 3/2016 | Krishnamoorthy | G10L 15/22 |
| | | | | 704/254 |
| 2016/0155445 | A1* | 6/2016 | Selfridge | G10L 15/22 |
| | | | | 704/249 |
| 2017/0076718 | A1* | 3/2017 | Popovici | G10L 15/02 |
| 2019/0043506 | A1* | 2/2019 | Rivkin | G06N 3/08 |
| 2019/0370323 | A1* | 12/2019 | Davidson | G10L 15/26 |
| 2019/0385610 | A1* | 12/2019 | Steelberg | G10L 25/90 |
| 2020/0027459 | A1* | 1/2020 | Chae | G10L 15/24 |
| 2020/0043475 | A1* | 2/2020 | Nguyen | G10L 15/04 |
| 2020/0090661 | A1* | 3/2020 | Ackerman | G10L 17/06 |
| 2021/0005204 | A1* | 1/2021 | Sankoda | G10L 15/26 |
| 2021/0074262 | A1* | 3/2021 | Duong | G10L 15/16 |
| 2021/0074277 | A1* | 3/2021 | Lewis | G10L 15/22 |
| 2021/0264916 | A1* | 8/2021 | Kim | G10L 15/22 |
| 2021/0280168 | A1* | 9/2021 | Ashikawa | G10L 15/193 |
| 2022/0012667 | A1* | 1/2022 | Pripstein | G10L 15/063 |
| 2022/0199091 | A1* | 6/2022 | Kanda | G10L 17/02 |
| 2022/0310077 | A1* | 9/2022 | Tu | G10L 15/22 |
| 2022/0318571 | A1* | 10/2022 | Ikeda | G06F 40/232 |
| 2022/0417659 | A1* | 12/2022 | Narayanan | G11B 27/036 |
| 2023/0066100 | A1* | 3/2023 | Cherukara | G10L 15/22 |
| 2023/0267926 | A1* | 8/2023 | Padfield | G10L 15/02 |
| | | | | 704/235 |
| 2023/0353400 | A1* | 11/2023 | Nguyen | G06F 40/242 |
| 2023/0360652 | A1* | 11/2023 | Li | G10L 15/02 |
| 2024/0265911 | A1* | 8/2024 | Assael | G10L 15/26 |
| 2024/0298072 | A1* | 9/2024 | Delserro | H04N 21/4758 |

OTHER PUBLICATIONS

Shivakumar, Prashanth Gurunath, et al. "Learning from past mistakes: improving automatic speech recognition output via noisy-clean phrase context modeling." APSIPA Transactions on Signal and Information Processing 8 (2019): e8. (Year: 2019).*

Ogata, Jun, and Masataka Goto. "Speech repair: quick error correction just by using selection operation for speech input interfaces." Interspeech. 2005. (Year: 2005).*

Errattahi, Rahhal, Asmaa El Hannani, and Hassan Ouahmane. "Automatic speech recognition errors detection and correction: A review." Procedia Computer Science 128 (2018): 32-37. (Year: 2018).*

Soboleva, Daria, et al. "Replacing human audio with synthetic audio for on-device unspoken punctuation prediction." ICASSP 2021-2021 IEEE International Conference on Acoustics, Speech and Signal Processing (ICASSP). IEEE, 2021. (Year: 2021).*

Arslan, Recep Sinan, et al. "Detecting and correcting automatic speech recognition errors with a new model." Turkish Journal of Electrical Engineering and Computer Sciences 29.5 (2021): 2298-2311. (Year: 2021).*

* cited by examiner

SYSTEMS AND METHODS FOR ADJUSTING A TRANSCRIPT BASED ON OUTPUT FROM A MACHINE LEARNING MODEL

BACKGROUND

A first user and a second user may engage in a conversation during a telephone call. A transcript of the conversation may be generated. For example, a device may generate the transcript using a speech-to-text functionality. The transcript may be used for training purposes.

DETAILED DESCRIPTION OF PREFERRED EMBODIMENTS

The following detailed description of example implementations refers to the accompanying drawings. The same reference numbers in different drawings may identify the same or similar elements.

A device may be used to generate a transcript of a conversation between a customer and a customer service agent. Typically, the transcript contains grammatical errors and contextual gaps, and generally underperform when used in real-world applications. The grammatical errors and contextual gaps cause processing errors for devices that utilize the transcript. In this regard, resources allocated for the devices are wasted due to the processing errors based by the grammatical errors and contextual gaps. Additional resources may be utilized to remedy the processing errors.

Additionally, the grammatical errors and contextual gaps negatively affect a quality of insights derived from the transcript. In other words, inaccurate insights are derived from the conversation with the customer due the grammatical errors and contextual gaps. Accordingly, resources (allocated based on the inaccurate insights) are wasted. The resources may include computing resources, storage resources, and/or network resources.

Implementations described herein are directed to improving a measure of accuracy of a transcript of audio data. For example, a transcription system may include machine learning models trained to detect incorrect tokens of the transcript of the audio data and generate alternative (correct) tokens for the incorrect tokens. A "token" as used herein may refer to a sequence of characters. For example, a token may be a word, a combination of words, among other examples.

In some implementations, a decoder (e.g., a first machine learning model) may determine that a token, of a plurality of tokens of the transcript, is incorrect. The incorrect token may be masked and provided to an encoder (e.g., a second machine learning model). The encoder may generate (or predict) an alternative transcript for the masked token (e.g., predict an alternative (correct) token).

The transcription system may generate additional data for transcribing the audio data. The additional data may include the alternative token and a portion of the audio data corresponding to the incorrect token. The additional data and the audio data may be used to generate a second transcript of the audio data. The decoder may determine whether the second transcript includes any portion that is incorrect (e.g., determine whether the second transcript includes an incorrect token). Based on determining that the second transcript does not include any portion that is incorrect, the second transcript may be provided to one or more devices. In some situations, the second transcript may be used as a raw data source for multiple call/audio analysis use cases, such as intent identification, resolution extraction, call summarization, key phrase extraction, among other examples.

By generating transcripts of audio data in this manner, the transcription system may improve a measure of accuracy of the transcripts. Additionally, by generating transcripts of audio data in this manner, the transcription system may preserve resources that would have been allocated and wasted due to inaccurate transcripts.

FIGS. 1A-1F are diagrams of an example 100 associated with adjusting a transcript based on output from a machine learning model. As shown in FIGS. 1A-1F, example 100 includes a first user device 105, a second user device 110, and a transcription system 115. First user device 105, second user device 110, and transcription system 115 are described in more detail below in connection with FIGS. 3 and 4.

First user device 105 may include a stationary or mobile user device. Second user device 110 may include a stationary or mobile user device. As an example, first user device 105 may be a user device of a customer and second user device 110 may be a user device of a customer service agent. Transcription system 115 may include one or more devices (e.g., associated with a cloud computing environment or a call center) that are configured to improve a measure of accuracy of a transcript of audio data. The audio data may be generated based on a conversation between the customer and the customer service agent. For example, the audio data may be generated from a communication session between first user device 105 and second user device 110. The communication session may include a telephone call between first user device 105 and second user device 110, a video call between first user device 105 and second user device 110, a webinar involving first user device 105 and second user device 110, among other examples.

While the description refers to a telephone conversation between two users, the description is applicable to a conversation (e.g., a telephone conversation, a video conference conversation, and/or an in-person conversation) between more than two users or between a voicebot and one or more users.

Figure 1A:
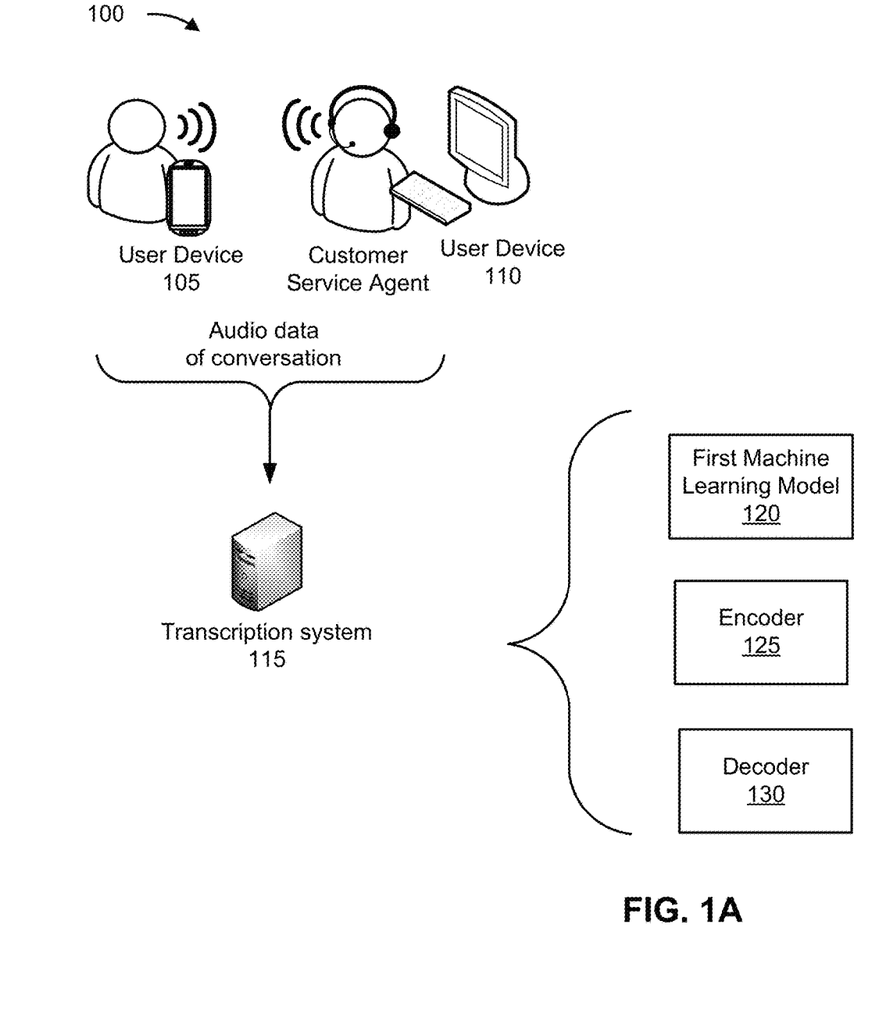
FIGS. 1A-IF are diagrams of an example associated with adjusting a transcript based on output from a machine learning model.

Transcription system 115 may include a first machine learning model 120, an encoder 125 (e.g., a second machine learning model), and a decoder 130 (e.g., a third machine learning model). In some implementations, first machine learning model 120 may be a neural network configured to perform speech-to-text operations. For example, first machine learning model 120 may be a custom attention based neural network configured to predict tokens based on the audio data. For instance, first machine learning model 120 may be configured to receive the audio data as an input and generate a transcript of the audio data. The transcript may include a plurality of tokens predicted based on the audio data.

Encoder 125 may include a custom neural network configured to predict tokens that are masked. As an example, encoder 125 may be a masked language model. For instance, encoder 125 may receive tokens that include a particular token that is masked. The particular token may be randomly masked. Encoder 125 may detect that the particular token is masked and may predict a value for the particular token.

A masked token is a placeholder for a token that has been masked (e.g., a placeholder for a word that has been masked). A masked token may provide an indication, to encoder 125, that the token (corresponding to the masked token) is to be predicted by encoder 125.

Decoder 130 may include a custom neural network that is configured to detect masked tokens that were predicted (e.g., by first machine learning model 120 and/or encoder 125) and determine whether the masked tokens were correctly predicted (e.g., by first machine learning model 120 and/or encoder 125). For example, decoder 130 may receive, as an input, the tokens and may detect that the particular token was a masked token. Decoder 130 may further determine whether the particular token was correctly predicted.

Figure 1B:
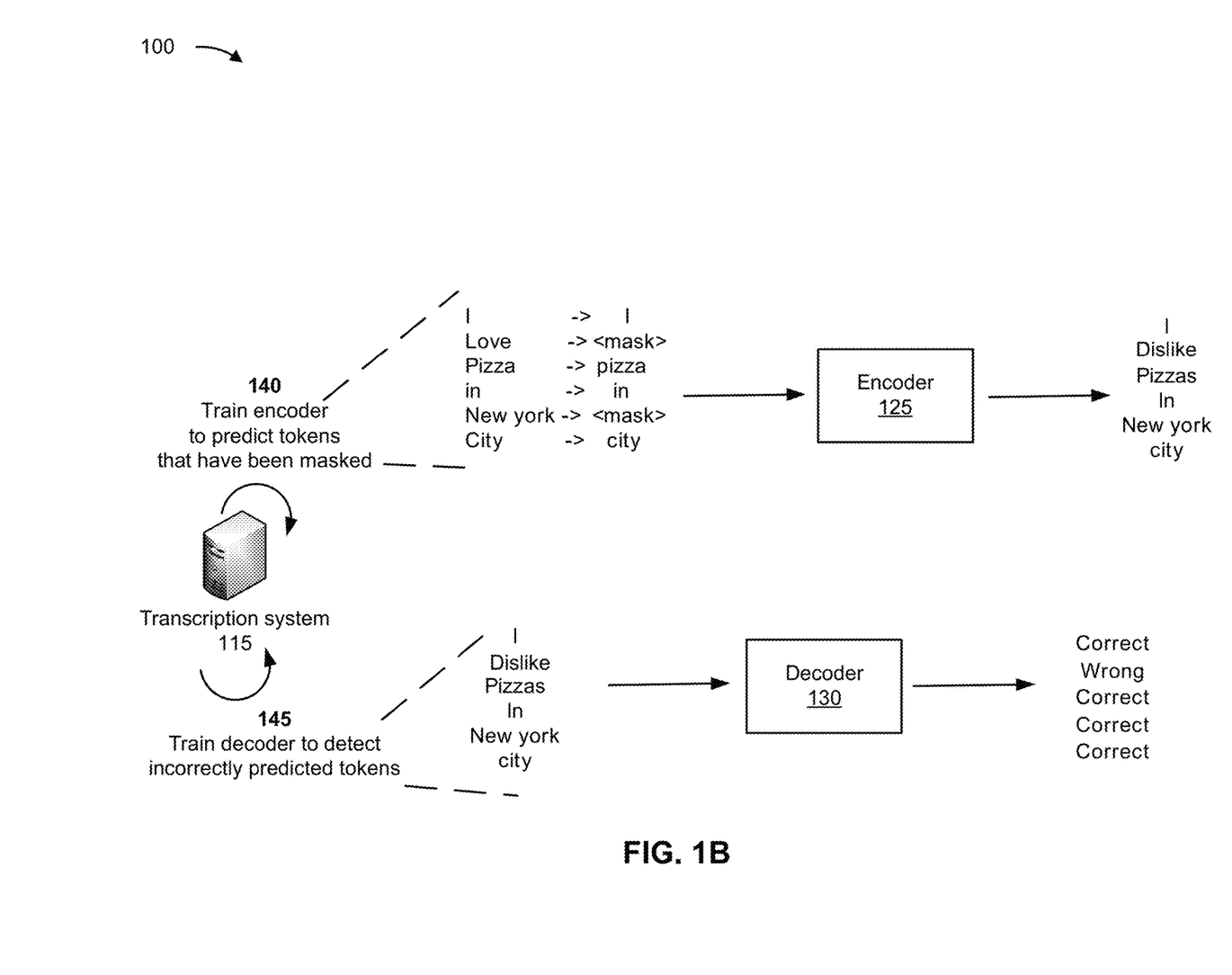

As shown in FIG. 1B, and by reference number 140, transcription system 115 may train encoder 125 to predict tokens that have been masked. For example, transcription system 115 may provide, as an input, a plurality of tokens to encoder 125. A portion of the plurality of tokens may be masked (e.g., thirty percent of the plurality of tokens, forty percent of the plurality of tokens, among other examples). In some implementations, the portion of tokens to be masked may be determined by a user associated with transcription system 115 and/or may be determined based on historical data of portions of tokens that have been masked, among other examples.

As shown in FIG. 1B, for example, the plurality of tokens includes "I," "Love," "Pizza," "In," "New york," and "City." Encoder 125 may receive, as an input, the plurality of tokens. A first portion of the plurality of tokens may be masked and a second portion of the plurality of token that may not be masked. For example, the first portion may include masked tokens corresponding to the tokens "Love" and "New york." The tokens "Love" (second token) and "New york" (five token) may be randomly masked (e.g., by transcription system 115). In some instances, encoder 125 may receive, as an input, an indication that the masked tokens are masked.

Encoder 125 may be trained to predict values for the masked tokens. For example, encoder 125 may be trained to predict the values for the masked tokens based on the tokens that are not masked. As shown in FIG. 1B, for example, encoder 125 may provide, as an output, a value of "Dislike" for the second token that is masked and a value of "New york" for the fifth token that is masked. For example, based on the tokens "pizza" and "city" and based on training data used to train encoder 125, encoder 125 may correctly predict the token "New york" for the fifth token that is masked. For example, encoder 125 may determine a context associated with the tokens "pizza" and "city" and may determine that "New york" is a token associated with the concept. Encoder 125 may be continuously trained using training data that enables encoder 125 to correctly predict the value for the second token.

The training data may enable encoder 125 to correctly predict values for tokens that have been masked. For example, the training data may include phrases, sentences, and/or paragraphs, among other examples. Based on the training data, encoder 125 may determine a relationship between tokens, determine a context associated with the tokens, determine a meaning associated with the tokens, among other examples (e.g., a relationship between words, a context associated with the words, a meaning associated with the words, among other examples). Encoder 125 may be trained to use one or more natural language processing algorithms to determine the relationship, the context, the meaning, among other examples.

Encoder 125 may be trained to predict masked tokens based on other tokens provided as an input to encoder 125. For example, encoder 125 may be trained to predict a masked token (e.g., a word) based on other tokens (e.g., other words) in a phase that includes the masked word. In this regard, encoder 125 may be a bidirectional model based on the ability to predict a masked token based on tokens occurring before the masked token and occurring after the masked token.

As shown in FIG. 1B, and by reference number 145, transcription system 115 may train decoder 130 to detect incorrectly predicted tokens. For example, transcription system 115 may provide, as an input, a plurality of tokens to decoder 130. The plurality of tokens may include a first portion that includes correctly predicted tokens and a second portion that includes incorrectly predicted tokens. Decoder 130 may be trained to detect the second portion that includes the incorrectly predicted tokens. For example, decoder 130 may provide, as an output, information indicating that the tokens, of the first portion, were correctly predicted and information indicating that the tokens, of the second portion, were incorrectly predicted.

As shown in FIG. 1B, for example, decoder 130 may receive, as an input, the plurality of tokens (e.g., that have been predicted by encoder 125). The plurality of tokens may include "I," "Dislike," "Pizza," "In," "New york," and "City." Decoder 130 may detect that the token "Dislike" was incorrectly predict. For example, based on the first portion of the plurality of tokens ("I," "Pizza," "In," "New york," and "City.") and based on training data used to train decoder 130, decoder 130 may predict that "Dislike" was incorrectly predicted. Accordingly, as shown in FIG. 1B, decoder 130 may provide, as an output, an indication that the token "Dislike" was incorrectly predicted and indications that the other tokens ("I," "Pizza," "In," "New york," and "City.") were correctly predicted.

Decoder 130 may be trained using training data that enables decoder 130 to detect tokens that were incorrectly predicted and tokens that were correctly predicted. For example, the training data may include phrases, sentences, and/or paragraphs, among other examples. In some examples, the training data may include text that is the basis of the predicted tokens. Referring to the example above, the training data may include the tokens "I," "Love," "Pizza," "In," "New york," and "City." In this regard, in the event decoder 130 erroneously detects a token, transcription system 115 may provide feedback, to decoder 130, indicating that the token was erroneously detected.

Based on the training data, decoder 130 may determine a relationship between tokens, determine a context associated with the tokens, and/or determine a meaning associated with the tokens, among other examples (e.g., a relationship between words, a context associated with the words, and/or a meaning associated with the words, among other examples). Decoder 130 may detect incorrectly predicted tokens based on the relationship, the context, and/or the meaning, among other examples.

Figure 1C:
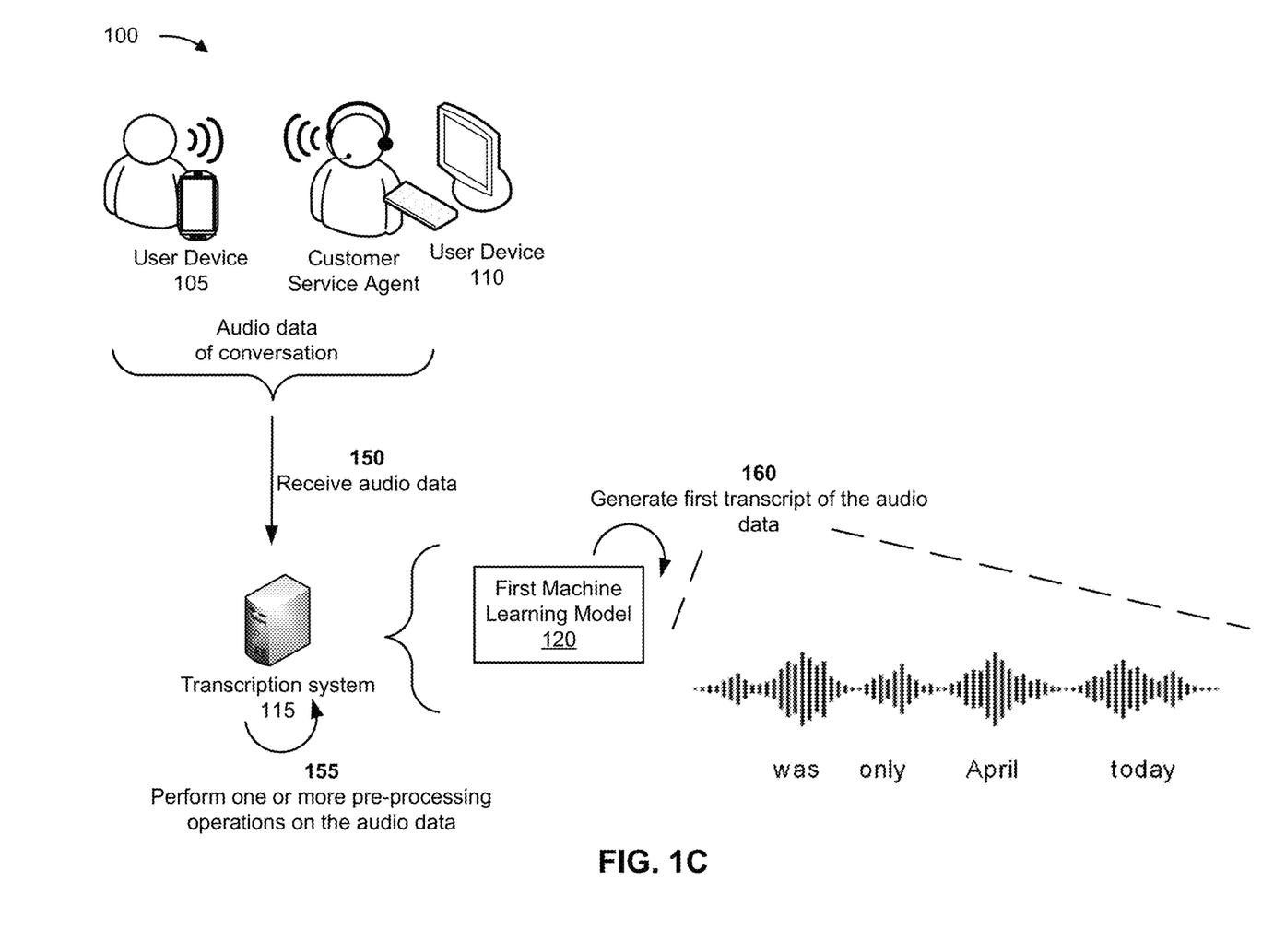

As shown in FIG. 1C, and by reference number 150, transcription system 115 may receive audio data. In the description to follow and merely as an example, the customer may use first user device 105 to place a call to engage in a conversation (e.g., a telephone conversation) with the customer service agent. The call may be routed to second user device 110 of the customer service agent. The audio data may be generated based on the conversation between the customer and the customer service agent.

Moreover, in the description to follow and merely as an example, assume that the customer service agent and/or another user (e.g., a supervisor of the customer service agent) desires a transcript of the conversation for training purposes and for call handling (or call routing) purposes. In this regard, the customer service agent and/or the supervisor may submit, to transcription system 115, a request for the transcript of the call. For example, transcription system 115 may receive the audio data as part of the request from user device 110 (and/or from a device of the supervisor).

As shown in FIG. 1C, and by reference number 155, transcription system 115 may perform one or more pre-processing operations on the audio data. In some implementations, transcription system 115 may remove noise from the audio data (e.g., remove white noise from the audio data). Additionally, or alternatively, transcription system 115 may adjust an amplitude of the audio data. Additionally, or alternatively, transcription system 115 may adjust a frequency of the audio data.

As shown in FIG. 1C, and by reference number 160, transcription system 115 may generate a first transcript of the audio data. For example, after performing the one or more pre-processing operations on the audio data, transcription system 115 may provide the audio data as an input to first machine learning model 120. First machine learning model 120 may process the audio data to generate the first transcript of the audio data.

In some implementations, first machine learning model 120 generates the first transcript of the audio data using one or more natural language processing algorithms. For example, first machine learning model 120 may use the one or more natural language processing algorithms to perform speech-to-text operations to generate the first transcript.

As shown in FIG. 1C, based on the audio data, first machine learning model 120 may generate a plurality of tokens as the first transcript. The plurality of tokens may include text generated based on different portions of the audio data, using the one or more natural language processing algorithms. For example, the plurality of tokens may include "I," "was," "only," "April," and "today." The token "I" may be generated based on a first portion of the audio data, the token "was" may be generated based on a second portion of the audio data, and so on.

Figure 1D:
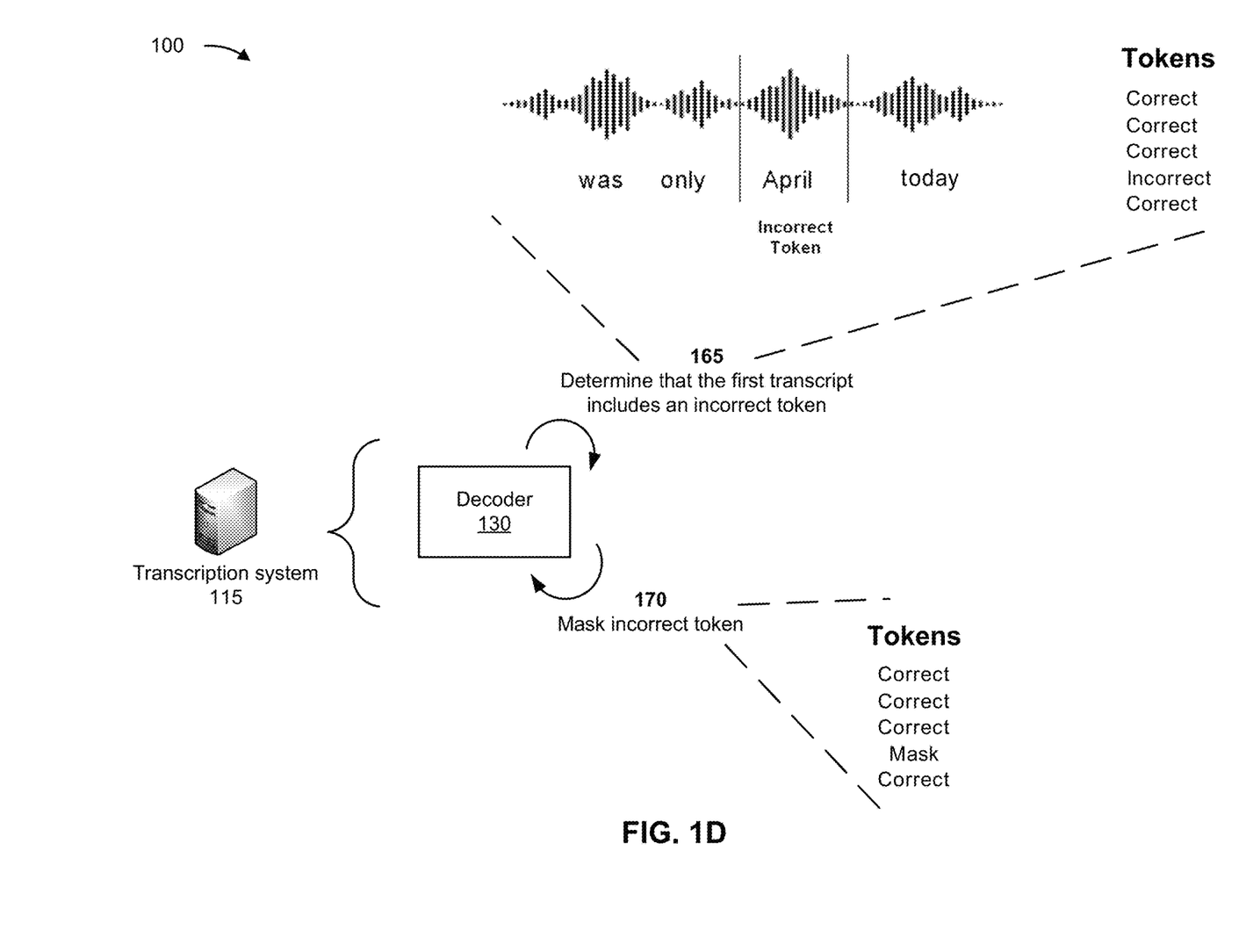

As shown in FIG. 1D, and by reference number 165, transcription system 115 may determine that the first transcript includes an incorrect token. In some implementations, after first machine learning model 120 generates the plurality of tokens, transcription system 115 may use decoder 130 to determine whether the plurality of tokens include an incorrect token. For example, transcription system 115 may provide the plurality of tokens as an input to decoder 130. Decoder 130 may analyze the plurality of tokens to detect an incorrect token, in a manner similar to the manner described above in connection with FIG. 1B.

As shown in FIG. 1D, for example, based on analyzing the plurality of tokens, decoder 130 may determine that the token "April" was incorrectly predicted. For example, decoder 130 may determine that the token "April" is not associated with a context associated with the other tokens of the plurality of tokens. As shown, in FIG. 1D, for example, decoder 130 may provide, as an output, an indication that the token "April" was incorrectly predicted.

As shown in FIG. 1D, and by reference number 170, transcription system 115 may mask the incorrect token. For example, based on determining that the first transcript includes the incorrect token, transcription system 115 may determine that an alternative transcript is to be generated for the incorrect token. Accordingly, transcription system 115 may determine that the incorrect token is to be masked and provided to encoder 125 for further processing. In this regard, transcription system 115 may mask the incorrect token to generate a masked token.

Figure 1E:
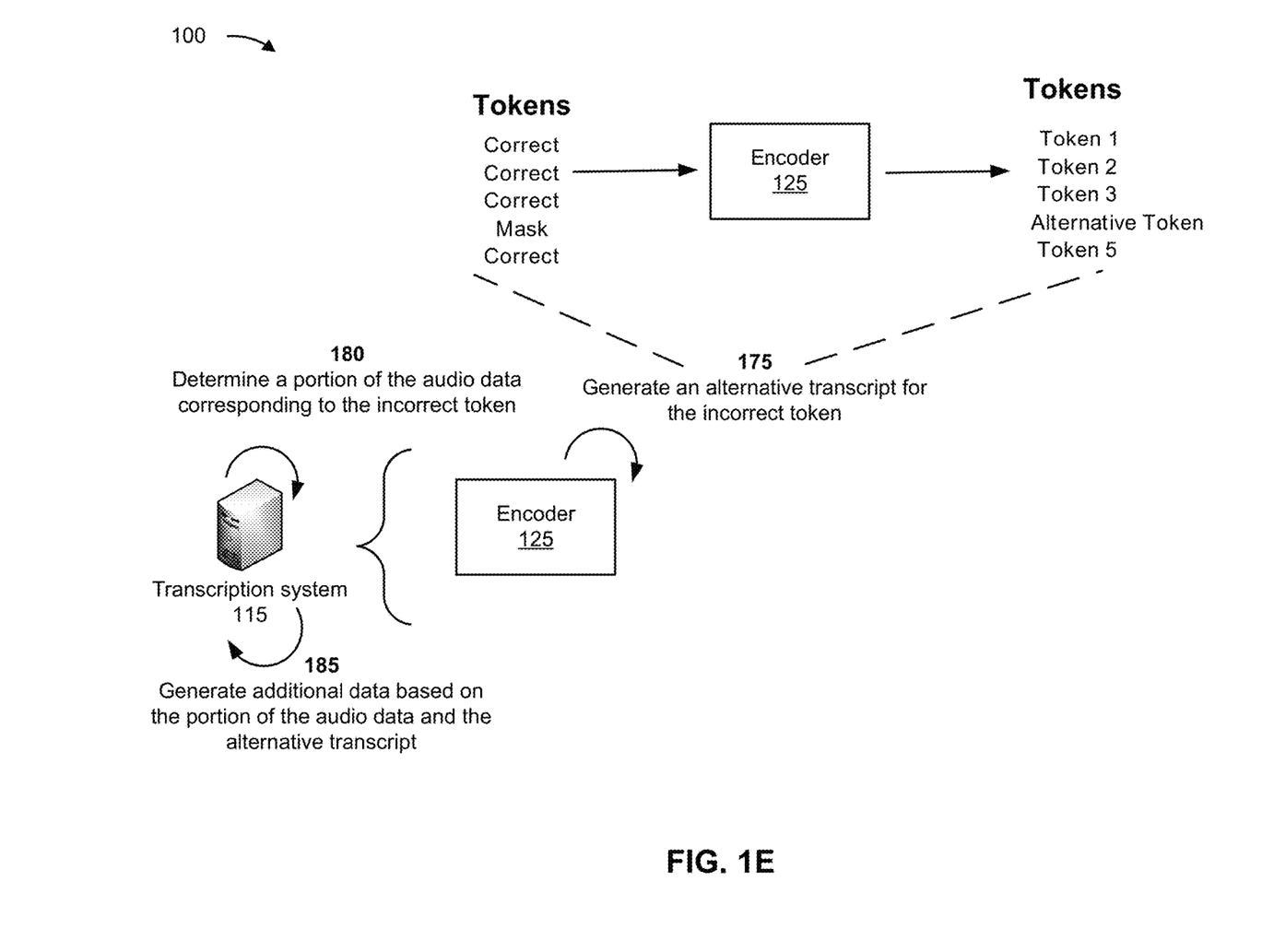

As shown in FIG. 1E, and by reference number 175, transcription system 115 may generate an alternative transcript for the incorrect token. For example, after masking the incorrect token, transcription system 115 may provide the masked token and the correct tokens to encoder 125 for processing. Encoder 125 may analyze the correct tokens and the masked token and may predict a value for the masked token, in a manner similar to the manner described above in connection with FIG. 1B.

For example, as shown in FIG. 1E, encoder 125 may predict an alternative token as the alternative transcript for the incorrect token. In this example discussed herein, encoder 125 may predict that the value for the masked token is the token "available."

As shown in FIG. 1E, and by reference number 180, transcription system 115 may determine a portion of the audio data corresponding to the incorrect token. For example, based on determining that the first transcript includes the incorrect token, transcription system 115 may analyze the audio data to determine the portion of the audio data that corresponds to the incorrect token. For instance, transcription system 115 may analyze the audio data to determine a period of time during which the incorrect token was uttered (e.g., by the customer or by the customer service agent).

In some implementations, transcription system 115 may determine a start time and an end time of the portion of the audio data corresponding to the incorrect token (e.g., corresponding to when the incorrect token was uttered). The start time and the end time of the portion of the audio data may be used to generate a second transcript of the audio data, as explained below.

As shown in FIG. 1E, and by reference number 185, transcription system 115 may generate additional data based on the portion of the audio data and the alternative transcript. For example, based on determining that the first transcript includes the incorrect token, transcription system 115 may determine that the additional data is to be provided to first machine learning model 120 improve a measure of accuracy of transcripts generated by first machine learning model 120 based on the audio data.

Accordingly, transcription system 115 may generate the additional data to provide contextual information that may be used by first machine learning model 120 to improve transcripts of the audio data. As an example, the additional data may provide, to first machine learning model 120, an indication that the portion of the audio data was incorrectly transcribed and an indication that the alternative token is a token correctly predicted for the portion of the audio data.

In some examples, the additional data may include the alternative token, information identifying the start time of the portion of the audio data, and information identifying the end time of the portion of the audio data. Alternatively, the additional data may include the alternative token and the portion of the audio data.

Figure 1F:
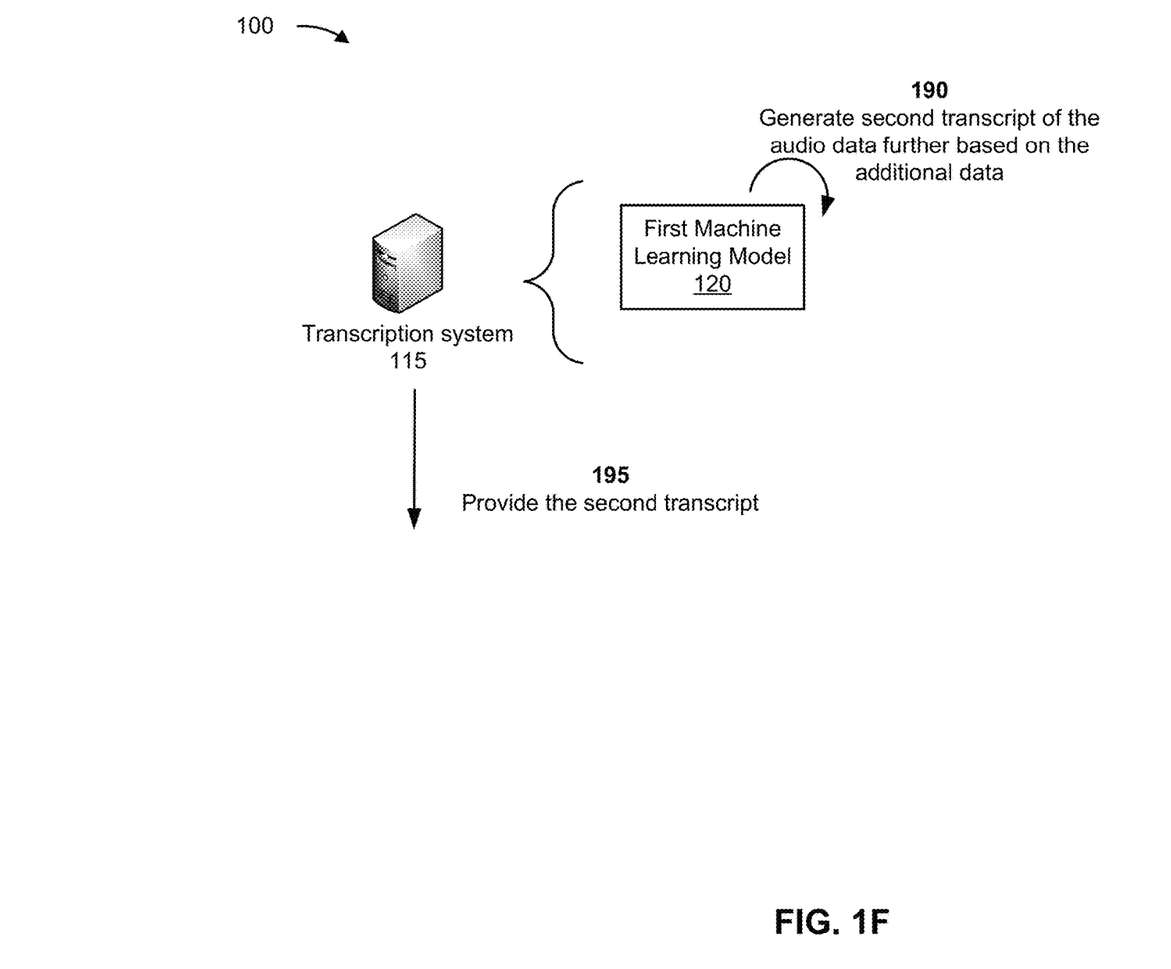

As shown in FIG. 1F, and by reference number 190, transcription system 115 may generate second transcript of the audio data further based on the additional data. For example, after generating the additional data, transcription system 115 may provide the additional data and the audio data to first machine learning model 120. First machine learning model 120 may generate a second transcript of the audio data based on the audio data and the additional data. For instance, the second transcript may include tokens that have been correctly generated and the alternative token.

Transcription system 115 may analyze the second transcription to determine whether the second transcript includes an incorrect token, in a manner similar to the manner described above in connection with FIG. 1D. For example, the second transcript may include new tokens that have not been previously evaluated by decoder 130. Accordingly, transcription system 115 may provide the second transcription to decoder 130 to cause decoder 130 to analyze the second transcript and determine whether the second transcript includes an incorrect token.

If decoder 130 determines that the second transcription includes an incorrect token, transcription system 115 may perform actions similar to the actions described above in connection with FIGS. 1D and 1E. Transcription system 115 may perform the actions to improve a measure of accuracy of the second transcript. In some implementations, transcription system 115 may perform the actions until first machine learning model 120 generates a transcript that does not include an incorrect token.

As shown in FIG. 1F, and by reference number 195, transcription system 115 may provide the second transcript. For example, based on determining that the second transcript does not include an incorrect token, transcription system 115 may provide the second transcript to one or more devices. For example, transcription system 115 may provide the second transcript to second user device 110, to the device of the supervisor, to one or more devices of a call center associated with the customer service agent and/or associated with the supervisor, among other examples.

By generating transcripts of audio data as described herein, transcription system 115 may improve a measure of accuracy of the transcripts. Additionally, by generating transcripts of audio data in this manner, transcription system 115 may preserve resources that would have been allocated and wasted due to inaccurate transcripts.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices other than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
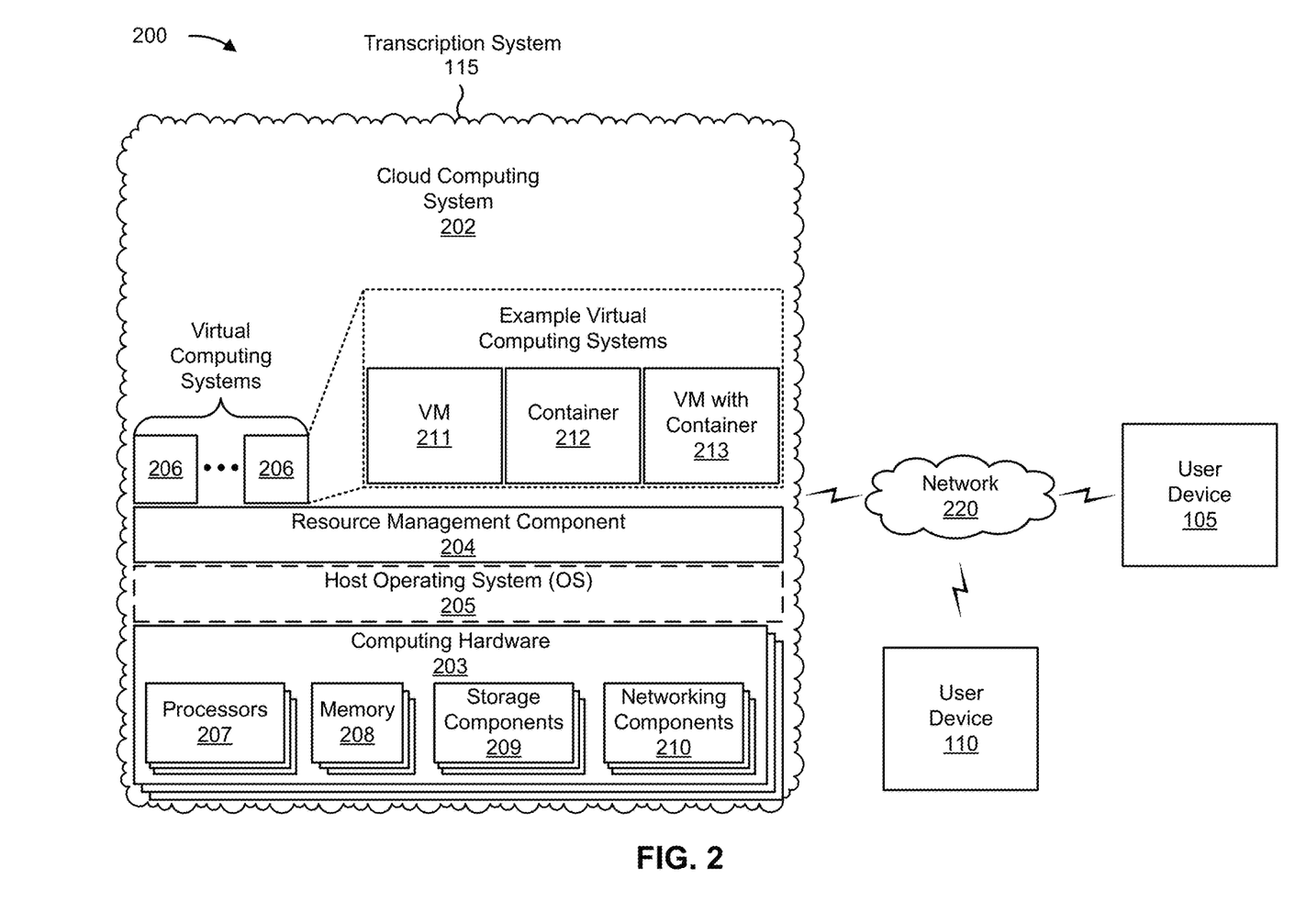
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transcription system 115, which may include one or more elements of and/or may execute within a cloud computing system 202. The cloud computing system 202 may include one or more elements 203-213, as described in more detail below. As further shown in FIG. 2, environment 200 may include a network 220, user device 105, and user device 110. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the transcription system 115 may include one or more elements 203-213 of the cloud computing system 202, may execute within the cloud computing system 202, and/or may be hosted within the cloud computing system 202, in some implementations, the transcription system 115 may not be cloud-based (e.g., may be implemented outside of a cloud computing system) or may be partially cloud-based. For example, the transcription system 115 may include one or more devices that are not part of the cloud computing system 202, such as device 300 of FIG. 3, which may include a standalone server or another type of computing device. The transcription system 115 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

First user device 105 may include includes one or more devices capable of receiving, generating, storing, processing, and/or providing information, as described elsewhere herein. First user device 105 may include a communication device. For example, first user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Second user device 110 may include includes one or more devices capable of receiving, generating, storing, processing, and/or providing information, as described elsewhere herein. Second user device 110 may include a communication device. For example, second user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
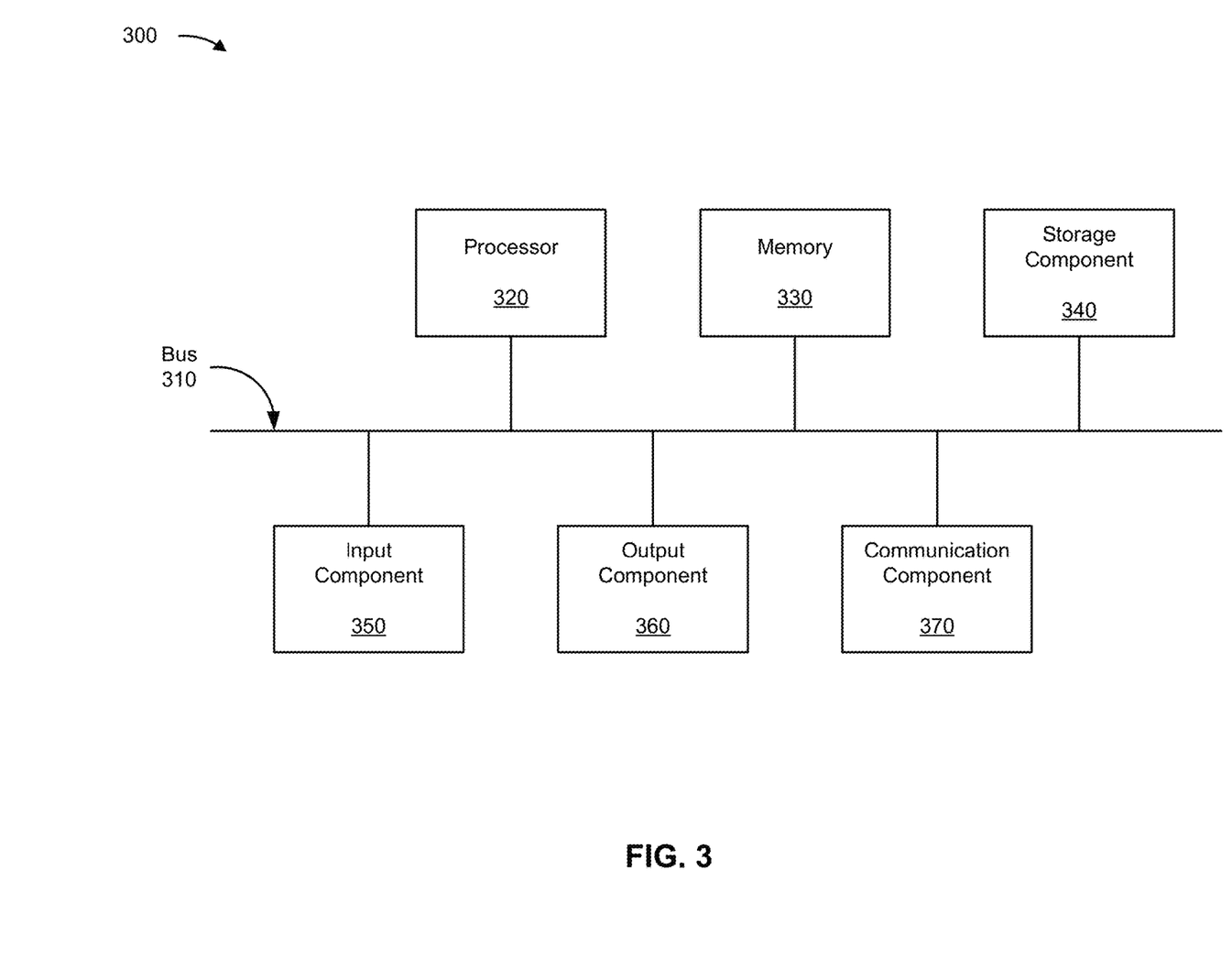
FIG. 3 is a diagram of example components of one or more devices of FIG. 2.

FIG. 3 is a diagram of example components of a device 300, which may correspond to first user device 105, second user device 110, and/or transcription system 115. In some implementations, first user device 105, second user device 110, and/or transcription system 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
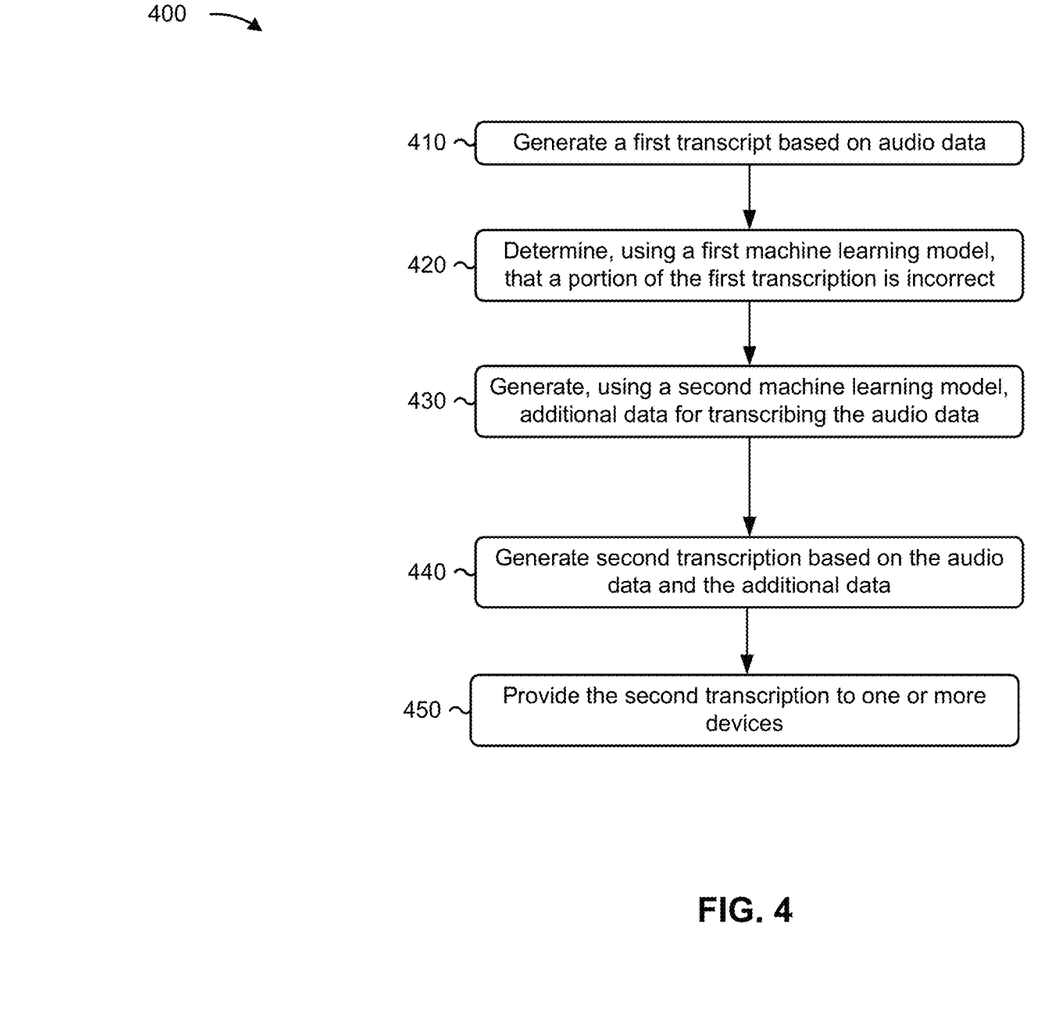
FIG. 4 is a flowchart of an example process relating to adjusting a transcript based on output from a machine learning model.

FIG. 4 is a flowchart of an example process 400 relating to adjusting a transcript based on output from a machine learning model. In some implementations, one or more process blocks of FIG. 4 may be performed by a transcription system (e.g., transcription system 115). In some implementations, one or more process blocks of FIG. 4 may be performed by another device or a group of devices separate from or including the transcription system, such as a first user device (e.g., first user device 105) and/or a second user device (e.g., second user device 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include generating a first transcript based on audio data (block 410). For example, the transcription system may generate a first transcript based on audio data, as described above.

As further shown in FIG. 4, process 400 may include determining, using a first machine learning model of the transcription system, that a portion of the first transcript is incorrect (block 420). For example, the transcription system may determine, using a first machine learning model of the transcription system, that a portion of the first transcript is incorrect, wherein the first machine learning model is configured to detect incorrect portions of the transcripts, as described above. In some implementations, the first machine learning model is configured to detect incorrect portions of the transcripts.

As further shown in FIG. 4, process 400 may include generating, using a second machine learning model, additional data for transcribing the audio data based on determining that the portion of the first transcript is incorrect (block 430). For example, the transcription system may generate, using a second machine learning model, additional data for transcribing the audio data based on determining that the portion of the first transcript is incorrect, wherein the additional data is generated using a portion of the audio data corresponding to the portion of the first transcript, as described above. In some implementations, the additional data is generated using a portion of the audio data corresponding to the portion of the first transcript.

As further shown in FIG. 4, process 400 may include generating a second transcript based on the audio data and the additional data (block 440). For example, the transcription system may generate a second transcript based on the audio data and the additional data, as described above.

As further shown in FIG. 4, process 400 may include providing the second transcript to one or more devices (block 450). For example, the transcription system may provide the second transcript to one or more devices, as described above.

In some implementations, generating the additional data comprises determining the portion of the audio data corresponding to the portion of the first transcript, and generating an alternative transcript of the portion of the audio data based on determining that the portion of the first transcript is incorrect, wherein the additional data includes the portion of the audio data and the alternative transcript of the portion of the audio data.

In some implementations, process 400 includes training a decoder to detect incorrect transcripts, wherein the decoder is configured to determine that the portion of the first transcript is incorrect, and training an encoder to generate correct transcripts, wherein the encoder is configured to generate the alternative transcript of the portion.

In some implementations, process 400 includes providing, to an encoder, training data that includes a plurality of tokens, wherein one or more first tokens, of the plurality of tokens, are masked, and wherein one or more second tokens, of the plurality of tokens, are not masked, and training the encoder to predict one or more values for the one or more first tokens, wherein the encoder is configured to generate the alternative transcript of the portion.

In some implementations, process 400 includes providing, a decoder, the one or more values and the one or more second tokens, and training the decoder to determine that the one or more values were incorrectly predicted by the encoder or were correctly predicted by the encoder, wherein the decoder is configured to determine that the portion of the first transcript is incorrect.

In some implementations, process 400 includes at least one of adjusting an amplitude of the audio data prior to generating the first transcript, or adjusting a frequency of the audio data prior to generating the first transcript.

In some implementations, process 400 includes determining whether the second transcript includes a portion that is incorrect, and providing the second transcript to the one or more devices based on the second transcript not including a portion that is incorrect.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a transcription system, the method comprising:
   receiving audio data from one or more devices;
   performing one or more pre-processing operations on the audio data to generate pre-processed audio data, wherein the one or more pre-processing operations include one or more of an adjustment of an amplitude of the audio data, an adjustment of a frequency of the audio data, or a removal of noise from the audio data;
   generating a first transcript based on the pre-processed audio data;
   determining, using a first machine learning model of the transcription system, that a portion of the first transcript is incorrect,
      wherein the first machine learning model is configured to detect incorrect portions of the transcripts;
   generating, using a second machine learning model, additional data for transcribing the pre-processed audio data based on determining that the portion of the first transcript is incorrect,
      wherein the additional data is generated using a portion of the pre-processed audio data corresponding to the portion of the first transcript;
   generating a second transcript based on the pre-processed audio data and the additional data; and
   providing the second transcript.

2. The method of claim 1, wherein generating the additional data comprises:
   determining the portion of the pre-processed audio data corresponding to the portion of the first transcript; and
   generating an alternative transcript of the portion of the pre-processed audio data based on determining that the portion of the first transcript is incorrect,
      wherein the additional data includes the portion of the pre-processed audio data and the alternative transcript of the portion of the pre-processed audio data.

3. The method of claim 2, further comprising:
   training a decoder to detect incorrect transcripts,
      wherein the decoder is configured to determine that the portion of the first transcript is incorrect; and
   training an encoder to generate correct transcripts,
      wherein the encoder is configured to generate the alternative transcript of the portion.

4. The method of claim 2, further comprising:
   providing, to an encoder, training data that includes a plurality of tokens,
      wherein one or more first tokens, of the plurality of tokens, are masked, and
      wherein one or more second tokens, of the plurality of tokens, are not masked; and
   training the encoder to predict one or more values for the one or more first tokens,
      wherein the encoder is configured to generate the alternative transcript of the portion.

5. The method of claim 4, further comprising:
   providing, to a decoder, the one or more values and the one or more second tokens; and
   training the decoder to determine that the one or more values were incorrectly predicted by the encoder or were correctly predicted by the encoder,
      wherein the decoder is configured to determine that the portion of the first transcript is incorrect.

6. The method of claim 4, wherein training the encoder comprises:
   training the encoder to predict one or more values for the one or more first tokens based on at least one of:
      determining a relationship between the one or more first tokens and the one or more second tokens,
      determining a context associated with the one or more first tokens and the one or more second tokens, or
      determining a meaning associated with the one or more first tokens and the one or more second tokens.

7. The method of claim 1, further comprising:
   determining whether the second transcript includes a portion that is incorrect; and
   providing the second transcript to the one or more devices based on the second transcript not including a portion that is incorrect.

8. A device, comprising:
   one or more processors configured to:
      receive audio data from one or more devices;
      perform one or more preprocessing operation on the audio data to generate pre-processed audio data, wherein the one or more pre-processing operations include one or more of an adjustment of an amplitude of the audio data, an adjustment of a frequency of the audio data, or a removal of noise from the audio data;
      generate a first transcript based on the pre-processed audio data;
      determine, using a first machine learning model of the device, that a portion of the first transcript is incorrect;
      generate, using a second machine learning model, additional data for transcribing the pre-processed audio data based on determining that the portion of the first transcript is incorrect,
         wherein the additional data is generated using a portion of the pre-processed audio data corresponding to the portion of the first transcript;
      generate a second transcript based on the pre-processed audio data and the additional data;
      determine whether the second transcript includes a portion that is incorrect; and
      selectively provide the second transcript or generate a third transcript of the pre-processed audio data based on determining whether the second transcript includes the portion that is incorrect, wherein the second transcript is provided based on the second transcript not including the portion that is incorrect, and wherein the third transcript is generated based on the second transcript including the portion that is incorrect.

9. The device of claim 8, wherein the additional data is first additional data, and wherein the one or more processors, to selectively provide the second transcript or generate the third transcript, are configured to:

determine that the second transcript includes a portion that is incorrect;

determine a portion of the pre-processed audio data corresponding to the portion of the second transcript;

generate second additional data for transcribing the pre-processed audio data based on determining that the portion of the second transcript is incorrect, wherein the second additional data is generated using a portion of the pre-processed audio data corresponding to the portion of the second transcript; and generate the third transcript based on the pre-processed audio data and the second additional data.

10. The device of claim 8, wherein, to remove the noise, the one or more processors are configured to:

remove white noise from the audio data.

11. The device of claim 8, wherein the first transcript includes a plurality of tokens, and wherein the one or more processors, to determine that the portion of the first transcript is incorrect, are configured to:

determine that one or more tokens, of the plurality of tokens, are incorrect.

12. The device of claim 8, wherein the one or more processors, to generate the additional data, are configured to:

generate an alternative transcript of the portion of the pre-processed audio data based on determining that the portion of the first transcript is incorrect, wherein the additional data includes the portion of the pre-processed audio data and the alternative transcript of the portion of the pre-processed audio data.

13. The device of claim 12, wherein the one or more processors, to determine that the portion of the first transcript is incorrect, are configured to:

determine, using a decoder, that the portion of the first transcript is incorrect; and wherein the one or more processors, to generate the alternative transcript, are configured to:

generate, using an encoder, the alternative transcript.

14. The device of claim 13, wherein the one or more processors are further configured to:

train the decoder to detect incorrect transcripts; and train the encoder to generate correct transcripts.

15. A non-transitory computer-readable medium storing a set of instructions, the set of instructions comprising:

one or more instructions that, when executed by one or more processors of a device, cause the device to:

receive audio data from one or more devices;

perform, prior to a transcription of the audio data, one or more pre-processing operations on the audio data to generate pre-processed audio data, wherein the one or more pre-processing operations include one or more of an adjustment of an amplitude of the audio data, an adjustment of a frequency of the audio data, or a removal of noise from the audio data;

determine, using a first machine learning model, that a portion of a first transcript of the pre-processed audio data is incorrect;

generate, using a machine learning model, additional data for transcribing the pre-processed audio data based on determining that the portion of the first transcript is incorrect, wherein the additional data is generated using a portion of the pre-processed audio data corresponding to the portion of the first transcript;

generate a second transcript based on the pre-processed audio data and the additional data;

determine whether the second transcript includes a portion that is incorrect; and selectively provide the second transcript or generate a third transcript of the pre-processed audio data based on determining whether the second transcript includes the portion that is incorrect, wherein the second transcript is provided based on the second transcript not including the portion that is incorrect, and wherein the third transcript is generated based on the second transcript including the portion that is incorrect.

16. The non-transitory computer-readable medium of claim 15, wherein the one or more instructions, when executed by the one or more processors, further cause the device to:

generate, using the first machine learning model, the first transcript based on the pre-processed audio data.

17. The non-transitory computer-readable medium of claim 15, wherein the additional data is first additional data, wherein the one or more instructions, that cause the device to selectively provide the second transcript or generate the third transcript, cause the device to:

determine that the second transcript includes a portion that is incorrect;

determine a portion of the pre-processed audio data corresponding to the portion of the second transcript;

generate second additional data for transcribing the pre-processed audio data based on determining that the portion of the second transcript is incorrect, wherein the second additional data is generated using a portion of the pre-processed audio data corresponding to the portion of the second transcript; and generate the third transcript based on the pre-processed audio data, the portion of the pre-processed audio data, and the second additional data.

18. The non-transitory computer-readable medium of claim 15, wherein the one or more instructions, that cause the device to determine that the portion of the first transcript is incorrect, cause the device to:

determine, using a decoder of the device, that the portion of the first transcript is incorrect; and wherein the one or more processors, to generate the additional data, are configured to:

generate, using an encoder of the device, the additional data.

19. The non-transitory computer-readable medium of claim 18, wherein the one or more instructions further cause the device to:

train the decoder to detect incorrect transcripts; and train the encoder to generate correct transcripts.

20. The non-transitory computer-readable medium of claim 19, wherein the one or more instructions to train the encoder further cause the device to:

train the encoder to predict one or more values for tokens
   based on at least one of:
   a relationship between tokens included in training data,
   a context associated with the tokens, or
   a meaning associated with the tokens.

\* \* \* \* \*